(12) United States Patent
Lotem et al.

(10) Patent No.: US 9,088,617 B2
(45) Date of Patent: *Jul. 21, 2015

(54) METHOD, A SYSTEM, AND A COMPUTER PROGRAM PRODUCT FOR MANAGING ACCESS CHANGE ASSURANCE

(71) Applicant: SKYBOX SECURITY INC., San Jose, CA (US)

(72) Inventors: Amnon Lotem, Ramot Hashavim (IL); Alexander Haiut, Kfar Saba (IL); Ravid Circus, Kfar Saba (IL); Moshe Raab, Sde Varburg (IL); Amos Arev, Savyon (IL); Gideon Cohen, Palo Alto, CA (US)

(73) Assignee: SKYBOX SECURITY INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/084,736

(22) Filed: Nov. 20, 2013

(65) Prior Publication Data

US 2014/0150050 A1    May 29, 2014

Related U.S. Application Data

(63) Continuation of application No. 12/124,155, filed on May 21, 2008, now Pat. No. 8,621,552.

(60) Provisional application No. 60/939,374, filed on May 22, 2007.

(51) Int. Cl.
    *H04L 29/06*    (2006.01)
(52) U.S. Cl.
    CPC ............ *H04L 63/20* (2013.01); *H04L 63/0263* (2013.01)

(58) Field of Classification Search
    USPC ............................................................ 726/1
    See application file for complete search history.

(56) References Cited

U.S. PATENT DOCUMENTS

| 6,721,713 B1* | 4/2004 | Guheen et al. ................. 705/1.1 |
| 2002/0010679 A1* | 1/2002 | Felsher ............................ 705/51 |

OTHER PUBLICATIONS

A web-enabled PDM system in a collaborative design environment|http://ac.els-cdn.com/S0736584502000820/1-s2.0-S0736584502000820-main.pdf?_tid=0c770f36-c6b2-11e4-9c41-00000aab0f6c&acdnat=1425943054_23759838dc30073b8a8f2c2cd0f2b38b|Xu et al.|2003|Pages 1-14.*

* cited by examiner

*Primary Examiner* — Mahfuzur Rahman
(74) *Attorney, Agent, or Firm* — Reches Patents

(57) ABSTRACT

A method for evaluating a deployment of a network access change request, the method includes: (a) formatting a network access change request to provide a formatted network access change request; wherein the formatted network access change request includes multiple formatted request items; wherein the multiple formatted request items includes a requested access type, an address of an access source, an address of an access destination; (b) determining multiple relationships between the multiple formatted request items and corresponding items of at least one entity out of a network model and a current network policy; and (c) responding to the network access change request in response to the multiple determined relationships.

18 Claims, 4 Drawing Sheets

US 9,088,617 B2

METHOD, A SYSTEM, AND A COMPUTER PROGRAM PRODUCT FOR MANAGING ACCESS CHANGE ASSURANCE

PRIORITY

This application claims the priority of U.S. provisional patent application Ser. No. 60/939,374 filing date May 22, 2007.

FIELD OF THE INVENTION

The invention relates to methods, systems, and computer program products for managing access change assurance.

BACKGROUND OF THE INVENTION

Maintaining a computer network includes the on-going task of updating firewall rules and settings. Firewall access rules and object definitions have to be updated to support required changes in the connectivity of the network. For example, as a new application is deployed in the network, the services of the application should become accessible to their intended users, and the servers that implement the application should be able to communicate with each other. Adding servers, networks, and users to the network or changing the topology of the network might also require changes to the network connectivity. On the other hand, security audits might require blocking an access capability in the network to improve security.

An organization might have tens, hundreds and even thousands of firewall. Each firewall might include hundreds of access rules, to support the requirements of the business and operational entities of the organization. When a change is required, it is not always simple to identify in which firewalls the change has to be implemented and how.

A non controlled implementation of changes might block the connection to critical services, or open an access that enables cyber-space attacks. In both cases a significant damage can be caused. To reduce such risks, IT organizations apply processes for approving requested changes and verifying their proper implementation.

Most current techniques for supporting theses processes are manual, use limited computer assistance, applying relative shallow checks. The result is a labor intensive process with limited effectiveness on reducing the risk.

Therefore, there is a need for methods, systems, and computer program products for managing access change assurance.

SUMMARY OF THE INVENTION

A method for evaluating a deployment of a network access change request, the method comprises: formatting a network access change request to provide a formatted network access change request; wherein the formatted network access change request comprises multiple formatted request items; wherein the multiple formatted request items comprise a requested access type, an address of an access source, an address of an access destination; determining multiple relationships between the multiple formatted request items and corresponding items of at least one entity out of a network model and a current network policy; and responding to the network access change request in response to the multiple determined relationships.

Conveniently, the method includes determining whether a requested connectivity that is a subject of the network access change request is currently implemented in the network; and determining whether the requested connectivity is in compliance with the current network policy.

Conveniently, the method includes evaluating a risk associated with a deployment of the network access change request.

Conveniently, the method includes: receiving an amended network access change request if a requested connectivity that is a subject of the network access change request is not in compliance with the current network policy; determining multiple relationships between multiple items of the amended network access change request and corresponding items of at least one entity out of a network model and a current network policy; and responding to the amended network access change request in response to the multiple determined relationships.

Conveniently, the method includes converting a formatted network access change request to at least one firewall access change request.

Conveniently, the method includes: formatting a firewall access change request to provide a formatted firewall access change request; wherein the formatted firewall access change request comprises multiple formatted request items; wherein the multiple formatted request items comprise a firewall identifier, requested access type, an address of an access source, an address of an access destination; determining multiple relationships between the multiple formatted request items and corresponding items of at least one entity out of a firewall model and a current firewall policy; and responding to the firewall access change request in response to the multiple determined relationships.

Conveniently, the method includes evaluating compliance of the change request with the current network policy.

A method for evaluating a deployment of a network access change request, the method includes: formatting a network access change request to provide a formatted network access change request; wherein the formatted network access change request comprises multiple formatted request items; wherein the multiple formatted request items comprise a requested access type, an address of an access source, an address of an access destination; determining multiple relationships between the multiple formatted request items and corresponding items of a network model; and evaluating a risk associated with a deployment of the network access change request.

A method for evaluating a deployment of a network access change request, the method includes: formatting a network access change request to provide a formatted network access change request; wherein the formatted network access change request comprises multiple formatted request items; wherein the multiple formatted request items comprise a requested access type, an address of an access source, an address of an access destination; and converting a formatted network access request to a firewall access change request in response to a network model.

Conveniently, the method includes formatting the firewall access change request to provide a formatted firewall access change request; wherein the formatted firewall access change request comprises multiple formatted request items; wherein the multiple formatted request items comprise a firewall identifier, requested access type, an address of an access source, an address of an access destination;

Conveniently, the method includes: formatting the firewall access change request to provide a formatted firewall access change request; wherein the formatted firewall access change request comprises multiple formatted request items; wherein the multiple formatted request items comprise a firewall identifier, requested access type, an address of an access source, an address of an access destination; determining multiple relationships between the multiple formatted request items and corresponding items of at least one entity out of a firewall model and a current firewall policy; and responding to the firewall access change request in response to the multiple determined relationships.

A method for evaluating a deployment of a firewall access change request, the method includes: formatting a firewall access change request to provide a formatted firewall access change request; wherein the formatted firewall access change request comprises multiple formatted request items; wherein the multiple formatted request items comprise a firewall identifier, requested access type, an address of an access source, a requested access destination; determining multiple relationships between the multiple formatted request items and corresponding items of at least one entity out of a firewall model and a current firewall policy; and responding to the firewall access change request in response to the multiple determined relationships.

Conveniently, the responding includes defining implementation details that facilitate a connectivity that is a subject of the firewall access change request.

Conveniently, the method includes searching for firewall access rules that all but one of the dimensions of the effective scopes of the firewall access rules match corresponding dimensions of the formatted firewall access change request.

Conveniently, the method includes determining a recommended location for new added firewall rule by searching for at least one currently implemented firewall access rule that comprises an address of access source, an address of access destination, and an access service, that match an address of access source, an address of access destination, and service of the new rule to be added.

Conveniently, the method includes determining at least one of the following: which firewall rules should be modified, which firewall rules should be added or which firewall rules should be deleted.

Conveniently, the method includes evaluating a risk associated with a deployment of the firewall access change request.

Conveniently, the method includes checking whether a packet sent from a requested access source can reach from a requested access source to a requested access destination and checking whether a requested access type can be allowed by a firewall identified by the firewall identifier.

Conveniently, the method includes: formatting a network access change request to provide a formatted network access change request; wherein the formatted network access change request comprises multiple formatted request items; wherein the multiple formatted request items comprise a requested access type, an address of an access source, an address of an access destination; determining multiple relationships between the multiple formatted request items and corresponding items of at least one entity out of a network model and a current network policy; and responding to the network access change request in response to the multiple determined relationships; wherein the responding comprises converting a formatted network access request to the firewall access change request in response to a network model A method for evaluating a deployment of a firewall access change request, the method includes: formatting a firewall access change request to provide a formatted firewall access change request; wherein the formatted firewall access change request comprises multiple formatted request items; wherein the multiple formatted request items comprise a firewall identifier, requested access type, an address of an access source, a requested access destination; defining implementation details that facilitate a connectivity that is a subject of the firewall access change request; and checking the implementation details.

Conveniently, the method includes evaluating a risk associated with a deployment of the firewall access change request.

Conveniently, the method includes checking whether a packet sent from a requested access source can reach from a requested access source to a requested access destination and checking whether a requested access type can be supported by a firewall identified by the firewall identifier.

Conveniently, the method includes representing a firewall access change request by at least one rule selected from an allow rule and a deny rule and evaluating the at least one rule.

Conveniently, the method includes checking for overlaps between a firewall rule generated in response to the firewall access change request and between currently defined firewall rules.

Conveniently, the method includes checking a consistency between the formatted firewall access change request and the implementation details.

Conveniently, the method includes checking whether implementation details that are associated with a certain formatted firewall access change request support precisely a connectivity that is a subject of the certain formatted firewall access change request.

Conveniently, the method includes checking a compliance of the implementation details with at least one entity out of a firewall access policy and a network access policy.

Conveniently, the method includes checking a compliance of a connectivity change that is a subject of the firewall access change request with at least one policy out of a network access policy and a firewall access policy.

Conveniently, the method includes comparing between the requested access type, the address of an access source, and the requested access destination of the firewall access change request and a supported access type, address of an access source, and an access destination of a policy access rule of the firewall access policy.

Conveniently, the method includes checking whether a packet sent from a source address of a network access policy rule can reach from the source address of the network access policy rule to a destination address of the network access policy rule; and checking whether the packet was allowed or denied by a firewall identified by the firewall identifier, and by considering the access type of the network access policy rule.

A method for verifying firewall changes, the method includes: receiving information representative of approved access change requests; checking a current configuration of a firewall to determine whether a connectivity that was a subject of an approved received change access requests is deployed; and determining whether the current configuration of a firewall is responsive to unapproved change access requests.

Conveniently, the method includes modeling the current configuration of the firewall such as to include multiple formatted request items of a firewall access change request.

Conveniently, the method includes: comparing the current configuration of the firewall to a previous configuration of the firewall to provide a configuration difference; and determining whether the entire configuration difference results from approves access change request deployed between a point in time in which the current configuration of the firewall was deployed and another point in time in which the previous configuration of the firewall was deployed.

Conveniently, the method includes: formatting a firewall access change request to provide a formatted firewall access change request; wherein the formatted firewall access change request comprises multiple formatted request items; wherein the multiple formatted request items comprise a firewall identifier, requested access type, an address of an access source, a requested access destination; defining implementation details that facilitate a connectivity that is a subject of the firewall access change request; and checking the implementation details.

Conveniently, the information representative of approved access change requests comprises implementation details associated with the approved access change requests.

Conveniently, the information representative of approved access change requests comprises approved formatted access change requests.

A method for evaluating a deployment of a firewall access change request, the method includes: receiving a firewall access change request and implementation details that facilitate a connectivity that is a subject of the firewall access change request; and checking the implementation details; wherein the checking comprises checking a compliance of the implementation details with at least one entity out of a firewall access policy and a network access policy.

Conveniently, the method includes evaluating a risk associated with a deployment of the firewall access change request.

A computer program product that comprises a computer readable medium that stores instructions for: formatting a network access change request to provide a formatted network access change request; wherein the formatted network access change request comprises multiple formatted request items; wherein the multiple formatted request items comprise a requested access type, an address of an access source, an address of an access destination; determining multiple relationships between the multiple formatted request items and corresponding items of at least one entity out of a network model and a current network policy; and responding to the network access change request in response to the multiple determined relationships.

Conveniently, the computer readable medium stores instructions for determining whether a requested connectivity that is a subject of the network access change request is currently implemented in the network; and determining whether the requested connectivity is in compliance with the current network policy.

Conveniently, the computer readable medium stores instructions for evaluating a risk associated with a deployment of the network access change request.

Conveniently, the computer readable medium stores instructions for: receiving an amended network access change request if a requested connectivity that is a subject of the network access change request is not in compliance with the current network policy; determining multiple relationships between multiple items of the amended network access change request and corresponding items of at least one entity out of a network model and a current network policy; and responding to the amended network access change request in response to the multiple determined relationships.

Conveniently, the computer readable medium stores instructions for converting a formatted network access change request to at least one firewall access change request.

Conveniently, the computer readable medium stores instructions for: formatting a firewall access change request to provide a formatted firewall access change request; wherein the formatted firewall access change request comprises multiple formatted request items; wherein the multiple formatted request items comprise a firewall identifier, requested access type, an address of an access source, an address of an access destination; determining multiple relationships between the multiple formatted request items and corresponding items of at least one entity out of a firewall model and a current firewall policy; and responding to the firewall access change request in response to the multiple determined relationships.

Conveniently, the computer readable medium stores instructions for evaluating compliance of the change request with the current network policy.

A computer program product that comprises a computer readable medium that stores instructions for: formatting a network access change request to provide a formatted network access change request; wherein the formatted network access change request comprises multiple formatted request items; wherein the multiple formatted request items comprise a requested access type, an address of an access source, an address of an access destination; determining multiple relationships between the multiple formatted request items and corresponding items of a network model; and evaluating a risk associated with a deployment of the network access change request.

A computer program product that comprises a computer readable medium that stores instructions for: formatting a network access change request to provide a formatted network access change request; wherein the formatted network access change request comprises multiple formatted request items; wherein the multiple formatted request items comprise a requested access type, an address of an access source, an address of an access destination; and converting a formatted network access request to a firewall access change request in response to a network model.

Conveniently, the computer readable medium stores instructions for formatting the firewall access change request to provide a formatted firewall access change request; wherein the formatted firewall access change request comprises multiple formatted request items; wherein the multiple formatted request items comprise a firewall identifier, requested access type, an address of an access source, an address of an access destination;

Conveniently, the computer readable medium stores instructions for:
formatting the firewall access change request to provide a formatted firewall access change request; wherein the formatted firewall access change request comprises multiple formatted request items; wherein the multiple formatted request items comprise a firewall identifier, requested access type, an address of an access source, an address of an access destination;
determining multiple relationships between the multiple formatted request items and corresponding items of at least one entity out of a firewall model and a current firewall policy; and
Responding to the firewall access change request in response to the multiple determined relationships.

A computer program product that comprises a computer readable medium that stores instructions for:
formatting a firewall access change request to provide a formatted firewall access change request; wherein the formatted firewall access change request comprises multiple formatted request items; wherein the multiple formatted request items comprise a firewall identifier, requested access type, an address of an access source, a requested access destination;
determining multiple relationships between the multiple formatted request items and corresponding items of at least one entity out of a firewall model and a current firewall policy; and responding to the firewall access change request in response to the multiple determined relationships.

Conveniently, the computer readable medium stores instructions for defining implementation details that facilitate a connectivity that is a subject of the firewall access change request.

Conveniently, the computer readable medium stores instructions for firewall access rules that all but one of the dimensions of the effective scopes of the firewall access rules match corresponding dimensions of the formatted firewall access change request.

Conveniently, the computer readable medium stores instructions for determining a recommended location for new added firewall rule by searching for at least one currently implemented firewall access rule that comprises an address of access source, an address of access destination, and an access service, that match an address of access source, an address of access destination, and service of the new rule to be added.

Conveniently, the computer readable medium stores instructions for determining at least one of the following: which firewall rules should be modified, which firewall rules should be added or which firewall rules should be deleted.

Conveniently, the computer readable medium stores instructions for evaluating a risk associated with a deployment of the firewall access change request.

Conveniently, the computer readable medium stores instructions for checking whether a packet sent from a requested access source can reach from a requested access source to a requested access destination and checking whether a requested access type can be allowed by a firewall identified by the firewall identifier.

Conveniently, the computer readable medium stores instructions for: formatting a network access change request to provide a formatted network access change request; wherein the formatted network access change request comprises multiple formatted request items; wherein the multiple formatted request items comprise a requested access type, an address of an access source, an address of an access destination; determining multiple relationships between the multiple formatted request items and corresponding items of at least one entity out of a network model and a current network policy; and responding to the network access change request in response to the multiple determined relationships; wherein the responding comprises converting a formatted network access request to the firewall access change request in response to a network model A computer program product that comprises a computer readable medium that stores instructions for: formatting a firewall access change request to provide a formatted firewall access change request; wherein the formatted firewall access change request comprises multiple formatted request items; wherein the multiple formatted request items comprise a firewall identifier, requested access type, an address of an access source, a requested access destination; defining implementation details that facilitate a connectivity that is a subject of the firewall access change request; and checking the implementation details.

Conveniently, the computer readable medium stores instructions for evaluating a risk associated with a deployment of the firewall access change request.

Conveniently, the computer readable medium stores instructions for checking whether a packet sent from a requested access source can reach from a requested access source to a requested access destination and checking whether a requested access type can be supported by a firewall identified by the firewall identifier.

Conveniently, the computer readable medium stores instructions for representing a firewall access change request by at least one rule selected from an allow rule and a deny rule and evaluating the at least one rule.

Conveniently, the computer readable medium stores instructions for checking for overlaps between a firewall rule generated in response to the firewall access change request and between currently defined firewall rules.

Conveniently, the computer readable medium stores instructions for checking a consistency between the formatted firewall access change request and the implementation details.

Conveniently, the computer readable medium stores instructions for checking whether implementation details that are associated with a certain formatted firewall access change request support precisely a connectivity that is a subject of the certain formatted firewall access change request.

Conveniently, the computer readable medium stores instructions for checking a compliance of the implementation details with at least one entity out of a firewall access policy and a network access policy.

Conveniently, the computer readable medium stores instructions for checking a compliance of a connectivity change that is a subject of the firewall access change request with at least one policy out of a network access policy and a firewall access policy.

Conveniently, the computer readable medium stores instructions for comparing between the requested access type, the address of an access source, and the requested access destination of the firewall access change request and a supported access type, address of an access source, and an access destination of a policy access rule of the firewall access policy.

Conveniently, the computer readable medium stores instructions for checking whether a packet sent from a source address of a network access policy rule can reach from the source address of the network access policy rule to a destination address of the network access policy rule; and checking whether the packet was allowed or denied by a firewall identified by the firewall identifier, and by considering the access type of the network access policy rule.

A computer program product for verifying firewall changes, the computer program product comprising: receiving information representative of approved access change requests; checking a current configuration of a firewall to determine whether a connectivity that was a subject of an approved received change access requests is deployed; and determining whether the current configuration of a firewall is responsive to unapproved change access requests.

Conveniently, the computer readable medium stores instructions for modeling the current configuration of the firewall such as to include multiple formatted request items of a firewall access change request.

Conveniently, the computer readable medium stores instructions for: comparing the current configuration of the firewall to a previous configuration of the firewall to provide a configuration difference; and determining whether the entire configuration difference results from approves access change request deployed between a point in time in which the current configuration of the firewall was deployed and another point in time in which the previous configuration of the firewall was deployed.

Conveniently, the computer readable medium stores instructions for: formatting a firewall access change request to provide a formatted firewall access change request; wherein the formatted firewall access change request comprises multiple formatted request items; wherein the multiple formatted request items comprise a firewall identifier, requested access type, an address of an access source, a requested access destination; defining implementation details that facilitate a connectivity that is a subject of the firewall access change request; and checking the implementation details.

Conveniently, the information representative of approved access change requests comprises implementation details associated with the approved access change requests.

Conveniently, the information representative of approved access change requests comprises approved formatted access change requests.

A computer program product for evaluating a deployment of a firewall access change request, the computer program product comprises: receiving a firewall access change request and implementation details that facilitate a connectivity that is a subject of the firewall access change request; and checking the implementation details; wherein the checking comprises checking a compliance of the implementation details with at least one entity out of a firewall access policy and a network access policy.

Conveniently, the computer readable medium stores instructions for evaluating a risk associated with a deployment of the firewall access change request.

BRIEF DESCRIPTION OF THE DRAWINGS

The foregoing and other objects, features, and advantages of the present invention will become more apparent from the following detailed description when taken in conjunction with the accompanying drawings. In the drawings, similar reference characters denote similar elements throughout the different views, in which.

DETAILED DESCRIPTION OF THE DRAWINGS

Figure 1:
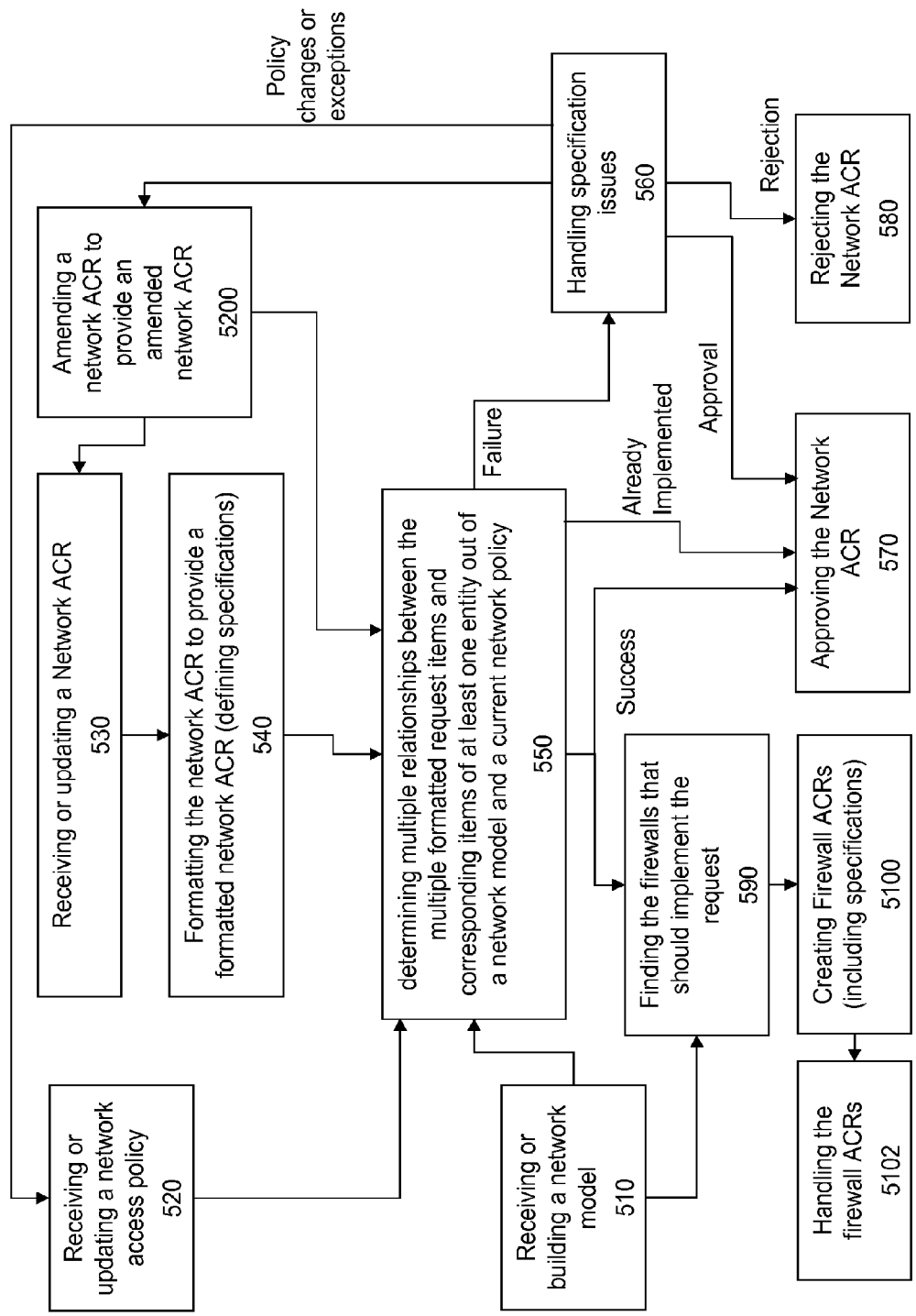
FIG. 1 illustrates a method for handling pre-deployment phases of a Network ACR (Access Change Request), according to an embodiment of the invention.

The invention relates to methods, systems, and computer program products that conveniently include or implementable by way of code. While a significant portion of the following description refers to methods, it is clear to a person who is skilled in the art that systems that can execute the methods as well as computer program products that includes code that when executed by a processor can cause the processor to execute the methods are also disclosed herein, even if not explicitly detailed.

Conveniently, methods are provided for supporting the process of assuring access change requests. The methods (of the "ACA"—Access Change Assurance) support both the pre-deployment phases of handling access change requests (compliance checks, consistency checks, risk assessment, approval), and the post-deployment phases—verifying that changes have been deployed in the firewalls only according to approved change requests, and that the deployments match the change specifications.

The term firewall is used in this document as a general name for a network device that can be used for filtering access in the network.

As a united method including the three methods disclosed, the method is based on formally modeling the firewall configurations, the access change requests, and the access policy statements. The modeling enables to automate the required checks and verification processes, supplying the user of the method (or the system) the relevant information to make decisions or examine inconsistencies.

Access change requests (ACRs) can be defined at the firewall level or at the network level. At the firewall level the ACR (Firewall ACR) relates to an individual firewall. It specifies which changes to the access permitted by the firewall should be performed. An ACR at the network level (Network ACR) specifies a required change to the connectivity of the network without relating to individual firewalls. A network ACR should be translated at some phase into firewall ACRs which will support the required connectivity change. For handling a Firewall ACR the method requires knowledge on the current configuration of the firewall. For handling a Network ACR, the method needs an access to a topological model of the network.

The three methods combined in the united methods are described separately, although it is clear to a person who is skilled in the art that the methods, while not necessarily depending on each other, could be carried out together, any two of which or all of them—in which:

a. Method 500 for handling the pre-deployment phases of a Network ACR;

b. Method 600 for handling the pre-deployment phases of a Firewall ACR; and c. Method 700 for performing a post-deployment verification of firewall changes.

It should be noted that while disclosed as methods, the methods 500, 600, 700, and any combination thereof, is conveniently implemented by way of a computer program product, that includes a computer readable medium, which includes instructions for the carrying out of the different methods, and of different combinations and portions thereof.

Also disclosed, even if not explicitly detailed, is a system that is adapted to carry out the different methods, and different combinations and portions thereof, usually by including such computer readable codes.

1. Handling the Pre-Deployment Phases of a Network ACRs (Method 500)

The ACA environment supplies an interface for feeding access change requests at the network level. The change is specified using a Network ACR record. The Network ACR record can be initiated at the ACA environment, or can be the continuation of a workflow ticket opened for the request in some workflow system used by the organization.

A network ACR includes specification of the request in formal enough way to enable automation of:

a. Pre-approval processes of the request such as compliance checks and risk assessment b. Identifying the firewalls in the network that should implement the request, and specifying these individual requests The details of a network related ACR might include:

a. Change request ID b. Reference to a ticketing (workflow) system that initiated the request (if relevant)

c. Requester details—name, group, contact information d. Description—free text description of the required change and its purpose e. Change specification—formal specification of the required access change to the network, such as the source, destination, and service of the required access f. Change request status—the lifecycle phase of the request, and other status indications g. Owner—the user which currently responsible for handling the request h. Due date—the date for implementing the change i. Risk and compliance—the results of compliance test and risk assessment, and information related to risk acceptance and approval 1.1. Handling a Network ACR—Process Overview FIG. 1 illustrates method 500 for handling the pre-deployment phases of a Network ACR, according to an embodiment of the invention. The different stages of method 500 are described in the next sections. Method 500 can work independently or in conjunction with method 600, a method for handling the pre-deployment phases of a Firewall ACR. It is noted that different embodiments of method 500 may include some or all of the stages herein described. It is noted that the order of stages and the workflow of method 500, according to different embodiments of which, is substantially illustrated in FIG. 1, while it is noted that not all of the stages, as well as additional stages not explicitly stated, may also be carried out in different implementations of method 500.

1.2. Receiving or Building a Network Model (Stage 510)

The network model represents, using software data structures, a required scope of a computer network. The data structures conveniently represent networks (also referred to as sub-networks), network nodes ("nodes"), network interfaces of nodes, and services installed on the nodes. The model relates to the topology of the network, the nodes and services in the network, and the configurations of the network devices (firewalls, routers, load balancer, IPS, worm protecting systems, etc.).

The model can also represent, in somewhat abstract way: (1) networks which are out of the scope of the model but are connected to entities in the model (e.g., the Internet, or networks of partners), and (2) groups of networks that the knowledge on their nodes and topology is limited (for example, only the range of IP addresses is known). A network model can be extended to include information on business assets, and information on threats and vulnerabilities.

A network model received or built in stage 510 is conveniently built by collecting and importing configurations of gateways and protection systems, and getting data on network nodes from various sources such as network and vulnerability scanners, patch management, tools, etc. The network model can be built and maintained for different purposes. The network model is used for evaluating network ACRs and for identifying the firewalls that should be changed in order to implement a network ACR.

1.3. Receiving or Updating a Network Access Policy (Stage 520)

Network access policy specifies constraints on the permitted access in the network. The policy might specify for example a list of ports that are not allowed to be used, services that the access to them is not allowed from particular network areas (or zones), limitation on the amount of sources or targets that can access a service, etc. This is the "security" part of the policy.

The policy can also require the existence of connectivity between specified sources and destinations. This is the "operation" part of the policy.

The policy is typically specified using Access Policy Rules. Examples for security policy rules are:

Rule 1, which specifies that the access from demilitarized zone (DMZ, also referred to as demarcation zone or perimeter network) networks to Windows NetBios ports in internal should be blocked:
a. NAME: Block Windows NetBios Access
b. IMPORTANCE: Critical
c. TYPE: No Access
d. SOURCE: DMZ networks (zone)
e. DESTINATION: Internal Networks (zone)
f. SERVICES: 135/TCP, 135/UDP, 137/TCP, 137/UDP, 138/UDP, 139/TCP Rule 2, which specifies that the access from external network to DNS ports in DMZ networks should be limited to no more than 5 different IP addresses:
a. NAME: Limited DNS Access
b. IMPORTANCE: Medium
c. TYPE: Limited Access
d. SOURCE: External Networks (zone)
e. DESTINATION: DMZ (zone)
f. SERVICES: 53/UDP
g. LIMITED_NUMBER_OF_DEST_IP_ADDRESSES: 5

Rule 3, which is an example for operation (connectivity) policy rules, specifies that it should be possible to access from any external network to any of the web servers of the home banking application (IP addresses 143.15.63.7-143.15.63.8):
a. NAME: Access to Home Banking Web Server
b. IMPORTANCE: High
c. TYPE: Full Access
d. SOURCE: External Networks (zone)
e. DESTINATION: 143.15.63.7-143.15.63.8
f. SERVICES: 80/TCP The network access policy might also include a list of exceptions (typically relating to source addresses, destination addresses, and services). Some of the exception might be associated to particular policy rules. The network access policy is used in this context for checking if the connectivity requirement specified in ACRs is complaint with the policy.

1.4. Receiving or Updating a Network ACR (Stage 530)

In stage 530 a network access change request is fed into the ACA environment, creating a Network ACR record. The stage relates also to updates which are made to the details of an existing ACR. The source of the request could be a change request ticket in a workflow system used by the organization, a file of some type in which the request is specified, or a graphic user interface for inserting the request details.

Initially, the access change request should include details such as:
a. Change request ID
b. Reference to a ticketing (workflow) system that initiated the request (if relevant)
c. Requester details—name, group, contact information
d. Description—free text description of the required change and its purpose
e. Change request status—the lifecycle phase of the request, and other status indications
f. Owner—the user which currently responsible for handling the request
g. Due date—the date for implementing the change Following is an example for a Network ACR:
a. CHANGE_ID: ACR-4711
b. DESCRIPTION:
  IP addresses for App3Servers (172.17.34.21, 172.17.34.22) should be accessible from the IP address of WebServer1 (143.15.63.7) to support new services.
c. DUE_DATE: Feb. 2, 2007 d. REQUESTER: John Elliot e. OWNER: Jim White f. STATUS: New (non-formal)

Figure 2:
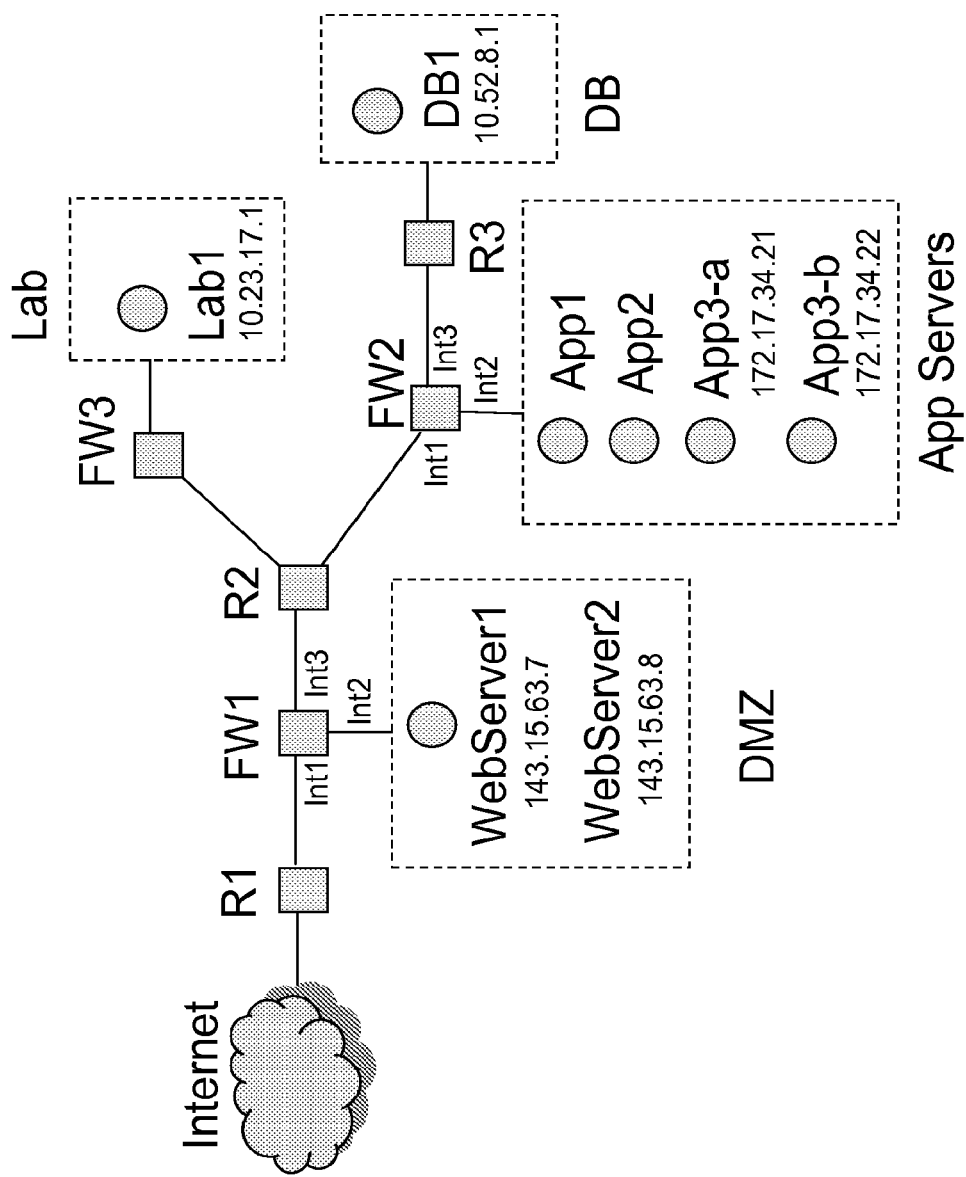
FIG. 2 illustrates a network, according to an embodiment of the invention.

It is noted that the ACR relates to network 100 illustrated in FIG. 2, even though it is clear to a person who is skilled in the art that ACR that relates to other networks, such as network of the types discussed above, are easily implementable. Network 100 includes several sub-networks: DMZ, Lab, App Servers, and database (DB). The sub-networks are connected using three routers (denoted R1, R2, and R3) and three firewalls (denoted FW1, FW2, and FW3). The organizational network (which includes the above sub-networks) is connected to the Internet using router R1.

The network ACR request example above is to enable an access from the WebServer (IP address 143.15.63.7) to TCP port 80 of two new application servers App3-a and App3-b (IP addresses 172.17.34.21 and 172.17.34.22). The due date of the request is Feb. 2, 2007.

In order to automatically evaluate the ACR it should also include a formal specification of the required access change, such as the exact source and destination of the required access. If the information is not supplied initially, it is fed in stage 540.

1.5. Formatting the Network Access Change Request to Provide a Formatted Network Access Change Request (Stage 540)

Stage 540 includes formatting the network ACR to provide a formatted network access change request; wherein the formatted network access change request includes multiple formatted request items; wherein the multiple formatted request items include: a requested access type, an address or addresses of an access source, an address or addresses of an access destination, a destination service or services of the access, (and may include other formatted request items, according to different embodiments of the invention).

This stage can be carried out automatically, and alternatively, in this stage the user specifies the required connectivity, or change to the connectivity, in a formal way. The specification might be combined of one or more specification items. Each specification item might include parameters such as:

a. Source—IP addresses, and or reference to nodes or group of nodes in the model b. Destination IP addresses, and or reference to nodes or group of nodes in the model c. The destination services or ports to be used d. The type of the change—full access between the source and the destination, no access, IP change, port change Following is an example for the formal specification of the required access changed described above (in an informal way). The specification consists of only one specification item (ITEM1):

ITEM1.CHANGE_TYPE: Full Access

ITEM1.SOURCE: 143.15.63.7

ITEM1.DESTINATION: 172.17.34.21, 172.17.34.22

ITEM1.SERVICES: ANY

Note that the specifications are defined independently of the set of the firewall in the network. For the convenience of the user, the specifications might relate to predefined groups of addresses or services. The specifications might also relate to an already implemented connectivity request, specifying a change to that connectivity (such extending or changing the source or destination addresses).

1.6. Determining Multiple Relationships Between the Multiple Formatted Request Items And Corresponding Items of at Least One Entity Out of a Network Model and a Current Network Policy (Stage 550)

Stage 550 includes determining multiple relationships between the multiple formatted request items (of stage 540) and corresponding items of at least one entity out of a network model (of stage 510) and a current network policy (of stage 520). The determining of the multiple relationship is conveniently used for checking the specifications (i.e. of the network ACR): once the network ACR includes formal specifications, the specifications can be checked. The check might include:

a. Checking if the required connectivity is already implemented in the network;

b. Checking the compliance of the required connectivity change with the network access policy;

c. Assessing the risk change.

It is noted that the determining of the multiple relationships is followed by responding to the network access change request in response to the multiple determined relationships, as disclosed in relation to the following stages of method 500. Firstly, however, the determining of multiple relationships (also referred to as checking thereof) is detailed in the following sections.

1.6.1. Checking if the Specifications are Already Implemented

In certain cases the requester submits a connectivity request, without knowing that the access which is needed is already possible within the network. In this check, that includes of determining whether a requested connectivity that is a subject of the network access change request is currently implemented in the network, an examination of whether all the specification items are already supported is carried out.

This is done by translating each specification item into an access query. In the case of Full Access specification item the query is substantially—will packets sent from the source nodes (of the specification item) to the destination nodes (of the specification item) reach their destination?

Answering the access query is done by analyzing the network model, taking in account the topology of the network, the routing information and the current configuration of firewalls. Appendix A includes a description and pseudo code of an algorithm for answering access queries.

The analysis might represent compactly group of packets using ranges of sources and destinations, rather than analyzing each packet separately. If a specification item is already supported in the current network, an indication for that is recorded in the ACR and the user is informed. If all the specification items of a specification are supported, the network ACR is approved with a dedicated indication that it is already supported (implementation is not needed).

1.6.2. Checking Compliance

This checking includes determining whether the requested connectivity is in compliance with the current network policy. Checking the compliance of a specification is done by checking the compliance of each of the specification items. This is done by intersecting the source, destination, and services ranges of the policy rule with those of the specification item.

Full Access specification item is incompliant with No Access policy rule if the intersection of their source, destination, and service ranges is not empty (i.e., intersection exists for each of these dimensions).

In the previous example, specification item 1 is incompliant with policy rule 1 since the specification requires access from a host in the DMZ to any port of a host in the internal networks, while policy rule 1 forbids Windows NetBios access from any host in the DMZ to any host in internal networks.

The intersection between the scopes of the policy rule and the specification items yields a non empty scope:

| a. | SOURCE: 143.15.63.7 | (part of a DMZ network) |
|---|---|---|
| b. | DESTINATION: 172.17.34.21, 172.17.34.22 | (part of the internal networks) |
| c. | SERVICE: 135/TCP, 135/UDP, 137/TCP, 137/UDP, 138/UDP, 139/TCP (the intersection with ANY) | |

Full Access specification item is incompliant with Limited Access policy rule if the intersection of their source, destination, and service ranges is not empty (i.e., intersection exists for each of these dimensions), and the number of services in the intersection is greater than the limit specified in the Limited Access Rule. Checking the compliance of a No Access specification is performed by comparing the specification item with full access rules in the operational part of the policy. A non-empty intersection means a violation.

The status of the compliance check is recorded within the ACR, and can be presented to the user. In the case of incompliance, the user can get details on the causes for the incompliance 1.6.3. Assessing Risk Change This check includes evaluating a risk associated with a deployment of the network access change request. Assessing risk change might include checks at various levels.

An initial level is to identify if the required access exposes vulnerabilities with high severity to a remote access from areas with a limited trust. The considered vulnerabilities are vulnerabilities on the destination nodes (of the specification). This is done if the source (of the specification) is considered as having a limited level of trust (e.g., external networks).

A more comprehensive examination applies attack simulation to the network model, assuming that the specified access is already implemented. The risk for cyber space attacks is computed based on the possible attack paths, the difficulty to exploit the involved vulnerabilities and the estimated impact on business assets. That risk is then compared to the original risk of the model (from attack simulation that does not assume the change in connectivity).

The changes in the risk or in the exposure of vulnerabilities are recorded within the ACR, and can be presented to the user.

1.7. Handling Specification Issues (Stage 560)

When the specifications are found to be incompliant with the network access policy or when the specifications imply a significant increase in the risk level, the system or the user has to address the situation. The possible actions of handling specification issues are, according to an embodiment of the invention: (a) to reject the Network ACR, (b) to make changes in the request (usually after consulting with a requester), (c) to change the network access policy (or to introduce exceptions to the policy), or (d) to accept the risk and approve the request.

In the previous example, the incompliance of specification item 1 with policy rule 1 has to be handled. It founds that the requester actually needs only access to TCP port 80 on the App3Servers, and the request and its formal specifications can be updated.

a. DESCRIPTION:

Port TCP/80 of App3Servers (172.17.34.21, 172.17.34.22) should be accessible from the IP address of WebServer1 (143.15.63.7) to support new services.

b. SPECIFICATIONS:
ITEM1.CHANGE_TYPE: Full Access
ITEM1.SOURCE: 143.15.63.7
ITEM1.DESTINATION: 172.17.34.21, 172.17.34.22
ITEM1.SERVICES: TCP/80

When the policy is changed or when the request is changed, the specifications check is invoked to re-examine the new situation.

1.8. Approving the Network ACR (Stage 570)

Approving the network ACR can be done automatically by the system if no issues were found during the specification checks, or might require the approval of authorized users. In both cases, an approval record with a description of the checks that were performed and their status is produced.

It is also possible to automatically include the required connectivity specified in the change in the "operational" part of the network access policy. Including the specified connectivity in the access policy becomes effective only after the change is successfully deployed. Adding the specifications to the "operational" part of the policy enables to verify that connectivity required by ACRs is preserved after additional changes to firewalls or to the network are performed (blocking such a connectivity will be reported as a violation of an operational rule in the policy). The connectivity requirement within the network access policy can be recorded with a reference to the corresponding ACR (which includes details such as the requester, and the purposes of the change).

Once a Network ACR is approved, the process is focused on how to implement the connectivity change, by conducting changes to individual firewalls.

1.9. Rejecting the Network ACR (Stage 580)

When severe issues are associated with the ACR, the decision might be to reject it. A rejection record with a description of the checks that were performed and their status is produced, enabling to find out the reasons for the rejection.

1.10. Finding the Firewalls that should Implement the Request (Stage 590)

A Network ACR is typically implemented by performing changes to individual firewalls in the network. In this stage the ACA environment finds the firewalls which have to be changed for implementing the network ACRs. This is done by translating the specification into a kind of access query: are packets sent from the source nodes (of the specification) to the destination nodes (of the specification) blocked by firewall access rules of firewalls.

Answering the access query is done by analyzing the network model, taking in account the topology of the network, the routing information and the current configuration of firewalls. Those firewalls which caused to the blocking of packets are reported with their corresponding blocking (deny) rules. Appendix A includes a description and pseudo code of an algorithm for answering access queries.

In our example, the access query that is examined is:
a. SOURCE: 143.15.63.7
b. DESTINATION: 172.17.34.21, 172.17.34.22
c. SERVICES: TCP/80

Firewall FW1 and firewall FW2 are found as blocking the access, and therefore should implement the request.

The analysis might represent compactly group of packets using ranges of sources and destinations, rather than analyzing each packet separately.

1.11. Amending a Network Access Change Request to Provide an Amended Network Access Change Request (Stage 5200)

Stage 5200 includes amending a network ACR to provide an amended network access change request if a requested connectivity that is a subject of the network access change request is not in compliance with the current network policy.

It is noted that stage 5200 is conveniently followed by carrying out stage 550 again for the amended network ACR, and possibly other stages of method 500 as well, e.g. starting from stage 530 or from stage 550. Especially, stage 5200 is followed by determining multiple relationships between multiple items of the amended network access change request and corresponding items of at least one entity out of a network model and a current network policy; and responding to the amended network access change request in response to the multiple determined relationships.

1.12. Creating Firewall ACRs (Stage 5100)

The creating of the one or more firewall ACRs includes converting a formatted network ACR to a firewall ACR, wherein the converting may be, according to an embodiment of the invention, in response to the network model (of stage 510); Once the firewalls that should implement the request are identified (using ACA or according to user's input), Firewall ACRs are automatically created for these firewalls. A Firewall ACRs has a similar structure to that of a Network ACR. It relates however to a specific firewall, and can include implementation details such as firewall access rules or groups of objects that have to be created or changed.

The Firewall ACRs that are created for implementing a Network ACR can be considered as its "children". The Firewall ACRs inherit the details and specification of their parent Network ACR. The specifications of the Firewall ACRs might be slightly different than that of their parent when Network Address Translation (NAT) rules are used in the network. The IP addresses of a Firewall ACR should be the IP addresses which are used by that firewall. Determining the source and destination IP addresses of the Firewall ACRs can be performed by the same process that found the relevant firewalls (stage 590). In that process the network model is analyzed to answer access queries which correspond to specification items. The analysis considers the NAT rules as the packets (or packet groups) are transferred through the network, translating their source or destination address according to NAT rules of the network devices. The addresses (source and destination) of the packets that can reach a firewall from the source nodes (and eventually can arrive at the destination) are the ones to be used in the specification items of the firewall.

Method 500, and especially stage 5100, are conveniently followed (if the network ACR is not rejected) by handling the firewall ACRs (denoted 5110). Conveniently, stage 5110 includes carrying out at least a portion of method 600.

2. Handling the Pre-Deployment Phases of a Firewall ACRs (Method 600)

The ACA environment supplies an interface for feeding access change requests at the firewall level. The change is specified using a Firewall ACR record. The Firewall ACR record can be initiated at the ACA environment, or can be the continuation of a workflow ticket opened for the request in some workflow system used by the organization. A Firewall ACR can also be created automatically by the ACA environment in order to implement a Network ACR.

Figure 3:
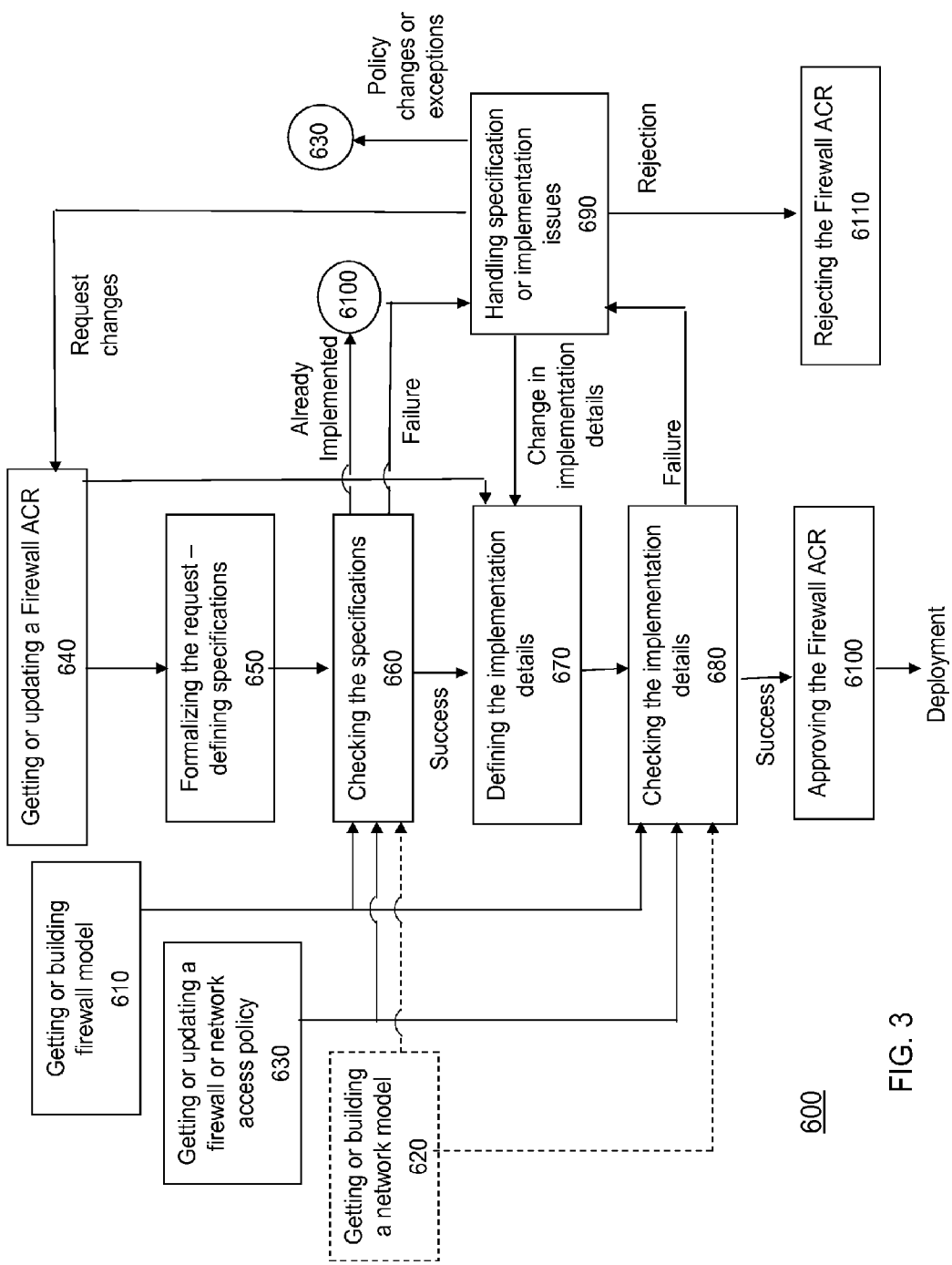
FIG. 3 illustrates method for handling pre-deployment phases of a Firewall ACR, according to an embodiment of the invention.

A Firewall ACR includes specification of the request and required implementation details of the request in formal enough way to enable automation of:

a. Pre-deployment processes of the request such as compliance checks and rule set consistency checks b. Post deployment processes which verify implementation according to the specification and compliance with the firewall access policy A Firewall ACR might include the following details:
a. Change request ID
b. Reference to a parent Network ACR (if relevant)
c. Reference to a ticketing system that initiated the request (if relevant)
d. Firewall details—name, IP address, . . .
e. Requester details—name, group, contact information
f. Description—free text description of the required change and its purpose
g. Change specification—formal specification of the required change, independently of the current rule set of the firewall, such as the source, destination, and the service of the required access.
h. Implementation details—detailed specifications of the required additions or changes to the access rule set, address translation rules, and group object definitions
i. Change request status—the lifecycle phase of the request, and other status indications
j. Risk and compliance—the results of compliance test, risk assessment data, and approval fields
k. Implementation verification—the results of deployment verification tests and approval fields 2.1. Handling a Firewall ACR—Process Overview FIG. 3 illustrates method 600 for handling the pre-deployment phases of a Firewall ACR, according to an embodiment of the invention. It is noted that method 600 can work independently or in conjunction with method 500, the method described above for handling the pre-deployment refinement, evaluation and approval of a Network ACR. It is noted that the order of stages and the workflow of method 600, according to different embodiments of which, is substantially illustrated in FIG. 3, while it is noted that not all of the stages, as well as additional stages not explicitly stated, may also be carried out in different implementations of method 600.

2.2. Getting or Building a Firewall Model (Stage 610)

Stage 610 is typically required if a model of the network is not in use. In this stage the current configuration of the firewall and other related information such as the firewall routing table are read and imported into the ACA environment. The configuration and the related information are used for building a model of the firewall. The firewall model represents the firewall network interfaces, routing information, the access rule set of the firewall, NAT (network address translation) rules, firewall group objects, and other firewall entities. The modeling of the firewall enables to simulate the behavior of the firewall and analyze which access is possible through the firewall.

2.3. Getting or Building a Network Model (Stage 620)

Stage 620 of getting or building a network model is an optional stage. Building a network model is described in stage 510 of method 500. When method 600 is used in conjunction of method 500, the model that was built for handling the network ACR can be used here.

2.4. Getting or Updating a Firewall or Network Access Policy (Stage 630)

A firewall access policy specifies constraints on the permitted access through firewalls. The firewall access policy might be defined in terms of zones (or areas), stating which access is permitted or not permitted between zones of certain types (External, Internal, DMZ, . . . ). A firewall access policy can be defined in the same terms as network access policy, and in fact, a network access policy can be used also as a firewall access policy.

In order to check if a Firewall ACR is compliant with the firewall policy, the network interfaces of the firewall should be mapped to the zones that appear in the policy. For example, the interface that leads to the Internet will be mapped to the External zone, and the network interface that leads to the DMZ sill be mapped to the DMZ zone.

Referring to the examples set forward in FIG. 2, the network interface denoted int1 is mapped to the External zone, the network interface denoted int2 is mapped to the DMZ zone, and the network interface denoted int3 is mapped to the Internal zone.

The firewall access policy might also include a list of exceptions (typically relating to source addresses, destination addresses, and services). Some of the exceptions might be associated to particular policy rules. The firewall access policy is used in this context for checking if the connectivity requirement specified in Firewall ACRs is complaint with the policy.

Alternatively, a network access policy can be used for the compliance check. That however requires using a network model.

2.5. Getting or Updating a Firewall ACR (Stage 640)

In stage 640 a firewall access change request is fed into the ACA environment, creating a Firewall ACR record. The stage also handles the update of an existing ACR. The source of the request could be a change request ticket in a workflow system used by the organization, a file of some type in which the request is specified, or a graphic user interface for inserting the request details. A Firewall ACR can also be created automatically by the ACA environment to implement a Network ACR.

Initially, the access change request should include details such as:

a. Change request ID
b. Reference to a parent Network ACR (if relevant)
c. Firewall—name, IP address
d. Reference to a ticketing (workflow) system that initiated the request (if relevant)
e. Requester details—name, group, contact information
f. Description—free text description of the required change and its purpose
g. Change request status—the lifecycle phase of the request, and other status indications
h. Owner—the user which currently responsible for handling the request
i. Due date—the date for implementing the change Example for some of the details in a Firewall ACR:
CHANGE_ID: ACR-4712
PARENT_ACR: ACR-4711
FIREWAL: FW1
DESCRIPTION:
   TCP port 80 of App3Servers (172.17.34.21, 172.17.34.22) should be accessible from the IP address of the Web-Server (143.15.63.7) to support new services.
DUE_DATE: Feb. 2, 2007
REQUESTER: John Elliot
OWNER: Jim White
STATUS: New (non-formal)

In order to automatically evaluate the ACR, the ACR should also include a formal specification of the required access change such as the exact source and destination of the required access. If the information is not supplied initially, it is fed in stage 650.

2.6. Formalizing the Request (Stage 650)

Stage 650 consists of formatting the firewall ACR to provide a formatted firewall ACR; wherein the formatted firewall access change request includes multiple formatted request items; wherein the multiple formatted request items include a firewall identifier, requested access type, an address of an access source, and an address of an access destination, and, according to other embodiments of the invention, additional formatted request items.

The formatting of stage 650 is carried out automatically from firewall ACR of stage 640, or alternatively, the user specifies the required connectivity, or change to the connectivity, in a formal way independently of the current set of firewall access rules. It is noted that stage 650 is conveniently an optional stage, and the user can instead directly define the implementation details (stage 670), i.e., defining which firewall access rules have to be added or changed, or which object groups have to be added or changed.

The formal specifications, if supplied, enables the ACA environment to assists the user with defining the implementation details and to verify that the implementation achieve the requirements (before or after the deployment). The specification might be combined of one or more specification items. Each specification item might include parameters such as:

a. Source—IP addresses or a reference to predefined group of addresses
b. Inbound Network Interface—the network interface from which the packets are expected to arrive (optional)
c. Destination—IP addresses or a reference to predefined group of addresses
d. Outbound Network Interface—the network interface which will be used for transferring the packets to the next network or network node (optional)
e. The destination services or ports and protocol to be used
f. The type of the change—full access between the source and the destination, no access, IP change, port change Following is an example for the formal specification of the required access changed describe above (in an informal way). The specification consists of only one specification item (ITEM1):
ITEM1.CHANGE_TYPE: Full Access
ITEM1.SOURCE: 143.15.63.7
ITEM1.INBOUND_INTERFACE: int2
ITEM1.DESTINATION: 172.17.34.21, 172.17.34.22
ITEM1.OUTBOUND_INTERFACE: int3
ITEM1.SERVICES: TCP/80

In many cases the inbound and outbound interfaces can be deducted automatically (for example based on routing information), so the user does not have to supply them.

For the convenience of the user, the specifications might relate to predefined groups of addresses or services. These groups might be synchronized or not with firewall group objects. When group of addresses or services are supported, the formal specifications might include specification items to create new groups, or change and delete existing groups. The specifications might also relate to an already implemented connectivity request, specifying a change to that connectivity (such extending or changing the source or destination addresses).

In case the Firewall ACR is a child ACR of a Network ACR, the formal specifications might be generated automatically when the child ACR is created (stage 5100 of method 500).

2.7. Checking the Specifications (Stage 660)

Stage 660 includes determining multiple relationships between the multiple formatted request items and corresponding items of at least one entity out of a firewall model (of stage 610) and a current firewall policy (of stage 630). Once the ACR includes formal specifications, the specifications can be checked. The check might include: (a) checking if the required connectivity is already implemented by the firewall; and/or (b) checking the compliance of the required connectivity change with the firewall or network access policy. It is noted that stage 660 is followed by responding to the firewall access change request in response to the multiple determined relationships, as disclosed in the following stages of method 600. The following sections specify different instances of stage 660, according to an embodiment of the invention.

2.7.1. Checking if the Specifications are Already Implemented

In certain cases the requester submits a connectivity request without knowing that the access which is needed is already possible within the network. In this check the system examines if all the specification items are already supported. This is done by translating each specification item into an access query at the firewall level. In the case of Full Access specification item the query is the following. Will packets sent from the specified source addresses behind the inbound interface to the specified destination nodes behind the outbound interface pass the firewall?

Answering the access query is done by taking in account the current firewall access rules and the routing rules of the firewall. The analysis might represent compactly group of packets using ranges of sources and destinations, rather than analyzing each packet separately. Appendix A includes a description and pseudo code of an algorithm for answering access queries.

If a specification item is already supported by the firewall, an indication for that is recorded in the ACR and the user is informed. If all the specification items of a specification are supported, the Firewall ACR is approved with a dedicated indication that it is already supported (implementation is not needed).

2.7.2. Checking Compliance

Checking the compliance of a specification is done by checking the compliance of each of the specification items. Checking the compliance of Full Access specification item can be performed by considering the specified connectivity as an existing connectivity (such as the result of an access analysis) and examining if it violates any of the firewall or network access policy rules (in the "security" part of the policy).

When the policy in use is a firewall access policy the compliance check is performed as follows; Full Access specification item is incompliant with No Access policy rule if the intersection of their source, destination, and service ranges is not empty (i.e., intersection exists for each of these dimensions). Full Access specification item is incompliant with Limited Access policy rule if the intersection of their source, destination, and service ranges is not empty (i.e., intersection exists for each of these dimensions), and the number of services in the intersection is greater than the limit specified in the Limited Access Rule.

Checking the compliance of a No Access specification is performed by comparing the specification item with full access rules in the operational part of the policy. A non-empty intersection means a violation.

When the policy in use is network access policy (and a network model is available) the compliance check is performed by transforming each policy rule to an access query: can packets sent from the source nodes (of the policy rule) to the destination nodes (of the policy rules) are allowed, blocked or limited by the network devices as specified in the policy rule.

Answering the access query is done by analyzing the network model, taking in account the topology of the network, the routing information and the current configuration of firewalls. Appendix A includes a description and pseudo code of an algorithm for answering access queries.

For the examined firewall, the connectivity (or connectivity limitation) specified in the ACR specification is considered as maintained by the firewall. During the access analysis, access which uses the examined new connectivity of the firewall (or limited by a new connectivity constraint) is recorded as affected by the change. If the network access policy rule is found to be violated, and the examined change in the firewall connectivity affected the violation, the specification item is marked as inconsistent with the network access policy.

The analysis might represent compactly group of packets using ranges of sources and destinations, rather than analyzing each packet separately.

An alternative approach for checking if a change specification item of a firewall is compliant with a network access policy is the following. Convert the network access policy into the terms of the firewall, i.e., identify which zones (or sources and destinations) of the network policy reside behind each network interface of the firewall, and what are the addresses of these zones in terms of the firewall (considering NAT rules in other network devices). This can be done by performing access queries that correspond to the policy rules of the network access policy, and examining the packets that can reach at the examined firewall (and can eventually arrive at the destination). Appendix A includes a description and pseudo code of an algorithm for answering access queries.

2.7.3. Assessing Risk Change

According to an embodiment of the invention, the assessing risk change includes evaluating a risk associated with a deployment of the firewall ACR. Assessing risk change is possible if a network model is available. An initial level of assessing risk change is to identify if the required access exposes vulnerabilities with high severity to a remote access from areas with a limited trust. The considered vulnerabilities are vulnerabilities on the destination nodes (of the specification). This is done if the source (of the specification) is considered as having a limited level of trust (e.g., external networks).

A more comprehensive examination applies attack simulation to the network model, assuming that the specified access is already implemented in the firewall. The risk for cyber space attacks is computed based on the possible attack paths, the difficulty to exploit the involved vulnerabilities and the estimated impact on business assets. That risk is then compared to the original risk of the model (from attack simulation that does not assume the change in connectivity).

The changes in the risk or in the exposure of vulnerabilities are recorded within the Firewall ACR, and can conveniently be presented to the user.

2.8. Defining the Implementation Details (Stage 670)

Stage 670 consists of defining implementation details that facilitate a connectivity that is a subject of the firewall ACR. Conveniently, stage 670 includes determining at least one of the following: which firewall rules should be modified, which firewall rules should be added or which firewall rules should be deleted. In the defining of the implementation details, the implementation details of the change are defined: what rules should be added, modified, or deleted in the current access rule set of the firewall, what changes should be performed to NAT rules and to group objects.

The implementation details can be inserted by the user in various ways. They can be specified in a file, and read by the systems; they can be inserted through an API (Application Programmable Interface) or through a graphic user interface (wherein such a user interface can present a view of the current firewall access rules, NAT rules, and group objects which appear in the current configuration of the firewall, as represented in the firewall model, and enable the user to define the changes relative to that situation); and so forth. The required changes can even be implemented in a non operational policy on the firewall itself, and then imported into the system for evaluation.

When specifications exist for the Firewall ACR, ways for implement the specifications can be suggested. This can be done by searching for a match between the source and destination specified in the specification item and those of existing firewall access rules.

More precisely, the method finds for each existing firewall access rule, the subset of source addresses, destination addresses, and services that are mutually not hidden by rules ordered before the firewall access rule. This combination will be denoted as the effective scope of the firewall access rule. The source, destination, and services are considered as the dimensions of the effective scope.

It should be noted that in certain cases, some other rule parameters should be taken in account such as source ports and network interface. In this case more dimensions are used for the effective scope (the number of dimension is denoted by n).

Stage 670 conveniently includes searching for firewall access rules that two of the dimensions of their effective scopes (or in the general case n−1 of the dimensions) exactly match the corresponding dimensions (properties) of the specification item.

The source dimension of the specification item exactly matches the source dimension of the effective scope of an firewall access rule, if they contain or represent exactly the same set of IP addresses.

Similarly, the destination dimension of the specification item exactly matches the destination dimension of the effective scope of an firewall access rule, if they contain or represent exactly the same set of IP addresses.

In the case of a match of two (n−1) dimensions, the method suggests extending the firewall access rule to include the items in the third (n) dimension of the specification item. In the example below, the method found a match between the specification item and the effective scope of firewall access rule 43:

The dimensions of the specification item:
ITEM1.SOURCE: 143.15.63.7
ITEM1.DESTINATION: 172.17.34.21, 172.17.34.22
ITEM1.SERVICES: TCP/80

The effective scope of rule 43:
RULE43.EFFECTIVE_SOURCE: 143.15.63.7
RULE43.EFFECTIVE_DESTINATION: 172.17.34.1, 172.17.34.2
RULE43.EFFECTIVE_SERVICES: TCP/80

The source and the services exactly match. The suggestion is to add addresses 172.17.34.21 and 172.17.34.22 to the destination of rule 43.

Since in many cases the best practice is to use object groups for the source and the destination, these addresses are suggested to be included in a new object group, and the object group is suggested to be added to the destination of rule 43.

Note that several implementation alternatives might be suggested. The user has to choose among them (or decide on an alternative implementation method).

The result of the process is a set of implementation instructions. The implementation instructions relate to the firewall access rules, NAT rules, object groups, or any combination thereof, and are specified in a formal way. Implementation instructions might relate to:
a. Creating a new entity (e.g., firewall access rule, or object group) with specified attribute values (e.g., address for the destination attribute of an firewall access rule)
b. Setting a new content to an existing entity by specifying the values of its attributes
c. Setting the value of a specific entity attribute
d. Adding items to an attribute of an existing entity (e.g. address ranges, to the source of a rule)
e. Removing items from an attribute of an existing entity
f. Removing an entity For example, the instructions for implementing specification item 1 could be represented in the following format:
a. Create object_group App3Servers with addresses [172.17.34.21, 172.17.34.21]
b. Add object_group App3Servers to rule 43 destination It is noted that the order of the instructions might be important (e.g., creation an object before adding it to a rule).

When a matching rule that can be extended is not found, method 670 conveniently continues by suggesting adding a new rule, and conveniently also suggesting where in the firewall access list the rule should be added. The location suggestion can be specified by indicating an existing rule in the firewall access that the new rule should be added before or after it (using a permanent ID of the rule), or by indicating two existing rules that the new rule should be located somewhere between them.

For example:
a. Create object_group App3Servers with addresses [172.17.34.21, 172.17.34.21]
b. Create new Allow rule with source addresses 143.15.63.7 destination object_group App3Servers services TCP/80 located before rule 17

The location recommendation (or constraint) is determined by checking for overlapping between the sources, destination, and services of the new suggested rule and those of the effective scope of existing firewall accesses (some overlap in all the dimensions). An Allow rule should be positioned before the first overlapping Deny rule in the rule set, otherwise part of its scope will be hidden by the earlier rule.

The Firewall ACR holds the implementation details. It might also handle a reference to the configuration of the firewall that was used when the implementation details were defined. In certain cases, the implementation details can be left empty, leaving the firewall operator to define the details during the deployment in a way that fulfill the specifications. In this case the checks and the approval of the ACR are based only on the specifications.

2.9. Checking the Implementation Details (Stage 680)

Once the ACR includes the implementation details, the proposed implementation can be checked. The check might include:
a. Checking consistency between the implementation details and the specifications;
b. Checking the compliance of the changes with the firewall or network access policy;
c. Assessing the change in risk;
d. Checking for overlapping with other rules.

Different instances of checking the implementation details, according to an embodiment of the invention, are offered below.

2.9.1. Checking Consistency with the Specifications

A consistency between the implementation details and the specifications assures that the proposed change achieves exactly the connectivity required in the specification. The check is required when the Firewall ACR includes specifications, and the implementation details were proposed by the user (rather than automatically extracted from the specifications).

In order to check that the proposed implementation achieves what required in the specifications each of the specification item can be transformed into an access query: can packets sent from the source nodes (of the specification item) to the destination nodes and services (of the specification item) are allowed or blocked by the firewall as specified in specification item. According to an embodiment of the invention, the checking includes checking whether a packet sent from a requested access source can reach from a requested access source to a requested access destination and checking whether a requested access type can be allowed by a firewall identified by the firewall identifier.

Answering the access query is done by analyzing the access through the modified firewall, starting from its different network interfaces, taking in account the firewall access, NAT, and the routing rules. The analysis might represent compactly group of packets using ranges of sources, destinations, and services rather than analyzing each packet separately. Appendix A includes a description and pseudo code of an algorithm for answering access queries.

In order to check if the implementation does not include changes that are not required by the specification, the following method can be used.

a. The current model of the firewall is used (without the proposed implementation changes). Access rules are added at the top of the rule set to represent the specification items.
b. A specification item that requires an access between source and destination is translated into a corresponding new Allow rule at the top of each relevant firewall access rule chain.
c. A specification item that requires no access between source and destination is translated into a corresponding new deny rule at the top of each relevant firewall access rule chain.
d. A rule which specify a change (e.g. a change in the used ports) is translated into two rules: deny and allow (e.g., denying the old set of ports and allowing the new set of ports).

The access from any network interface of the firewall to all its other network interfaces is then checked. The check is performed first for the current model with the rules that generated for representing the specification ("model A"), and then for the proposed implementation of the firewall ("model B").

According to an embodiment of the invention, method 600 includes representing a firewall access change request by at least one rule. The one or more rules can include one or more allow rules and, additionally or alternatively, one or more deny rule. The representing is followed by and evaluating the one or more rules.

A check can be performed by creating for each network interface an access query: such as "which packets that their source is one of the addresses which can reside behind that network interface (based, for example, on routing information) can pass the firewall and be routed to other network interfaces of the firewall?".

Answering the access query is done by analyzing the access through firewall (model A or model B), starting from the examined network interface, and taking in account the firewall access, NAT, and routing rules. The analysis might represent compactly group of packets using ranges of sources, destinations, and services rather than analyzing each packet separately. Appendix A includes a description and pseudo code of an algorithm for answering access queries.

The result of each check is conveniently a set of packets that were able to pass through the firewall. The expectation is to get identical sets.

If the set of packets that can pass through the model B firewall model (proposed implementation) includes packets that are not included in the result of the checking model A, the proposed implementation enables access that was not required and does not exist in the current model.

If some of packets that can pass through the model A firewall (current configuration plus specifications) are not included in the result of the model B check, the proposed implementation discards some of the required access (based on current firewall behavior and the specifications).

Note that the analysis might represent compactly group of packets using ranges of sources, destinations, and services rather than representing each packet separately.

A variation of this check can be based on checking for each firewall access chain (e.g., inbound, and outbound) if the set of packets that can pass the chain is identical in model A and in model B. The set of packets that can pass an firewall access chain can be represented by the set of effective scopes of the Allow rules in the chain.

2.9.2. Checking Compliance

Checking the compliance of the proposed implementation is done by applying the changes to the current firewall model (creating, changing, or deleting rules and group objects), and performing compliance check to the modified model.

When the policy in use is a firewall access policy the compliance check is performed by transforming each of its policy rules to an access query: can packets sent from the source nodes (of the policy rule) to the destination nodes (of the policy rules) are allowed, blocked or limited by the firewall as specified in the policy rule.

Answering the access query is done by analyzing the access through the modified firewall, starting from its different network interfaces, taking in account the firewall access, NAT, and the routing rules. The analysis might represent compactly group of packets using ranges of sources, destinations, and services rather than analyzing each packet separately. Appendix A includes a description and pseudo code of an algorithm for answering access queries.

If the firewall access policy rule is found to be violated, and that violation is not found in the original firewall model the implementation is marked as incompliant with the firewall access policy.

It is also possible to record during the access analysis, packets or packet groups which pass through firewall access that have been changed, or are blocked as the result of a change. The record includes the ID of the changed rule. If the firewall access policy is found to be violated, those changed rules that were recorded are marked as violating the firewall access policy.

The same method, with some modifications, can be used when the policy in use is a network access policy. In this case the access policy rules are translated into network access queries, and answering the queries required the existence of a network model.

An alternative approach for checking if the firewall with the applied changes is compliant with a network access policy is the following. Convert the network access policy into the terms of the firewall, i.e., identify which zones (or sources and destinations) of the network policy reside behind each network interface of the firewall, and what are the addresses of these zones in terms of the firewall (considering NAT rules in other network devices). Then translate each policy rule that its sources and destination zones are behind interfaces of the firewall into access queries. The access queries relate to source and destination addresses expressed in terms of the firewall. The analysis of the access queries is as explained above.

The conversion of the network access policy into the terms of the firewall can be done by performing access queries that correspond to the policy rules of the network access policy, and examining the packets that can reach at the examined firewall (and can eventually arrive at the destination). Appendix A includes a description and pseudo code of an algorithm for answering access queries.

2.9.3. Assessing Risk Change

Assessing risk change is possible if a network model is available. An initial level is to identify if the required access exposes vulnerabilities with high severity to a remote access from areas with a limited trust. The considered vulnerabilities are vulnerabilities on the destination nodes (of the specification). This is done if the source (of the specification) is considered as having a limited level of trust (e.g., external networks).

A more comprehensive examination applies attack simulation to the network model, assuming that the specified access is already implemented in the firewall. The risk for cyber space attacks is computed based on the possible attack paths, the difficulty to exploit the involved vulnerabilities and the estimated impact on business assets. That risk is then compared to the original risk of the model (a model that does not include the change in the firewall).

The changes in the risk or in the exposure of vulnerabilities are recorded within the Firewall ACR, and can be presented to the user.

2.9.4. Checking for Overlapping with Other Rules

When a new rule is inserted into the rule set, or when existing rule is changed, the ACA environment can check if it has an overlap with rules that appear before or after it in the rules list; wherein two rules are said to have an overlap if the intersection of their scopes is not empty. An intersection between the scopes of rules is found by intersecting their dimensions (source, destination, and services) respectively. The intersection is empty if at least one of the intersected dimensions is empty. An overlap between two rules means that the scope of the later rule in the list is partially (and sometimes fully) hidden by the earlier rule in the list, i.e., part of its scope is not effective. The user is conveniently informed about these cases, as they might cause to undesired redundancy or inconsistency in the rules list.

According to an embodiment of the invention, method 600 includes checking for overlaps between a firewall rules generated in response to the firewall access change request and between currently defined firewall rules.

2.10. Handling Specification or Implementation Issues (Stage 690)

When the specifications or the implementation checks find issues (incompliance, significant risk increase, inconsistency between the implementation and the specifications, etc.) the system or the user has to address the situation.

If the issues are related to the implementation, the typical action is to change the implementation details, and then re-check the implementation. If the issues are related to the specifications, or if the implementation cannot be changed to address the implementation issues, the possible actions are: to reject the Firewall ACR, to make changes in the request (after consulting with the requester), to change the firewall or network access policy (or to introduce exceptions to the policy), or to accept the risk and approve the request.

When the policy is changed or when the request is changed, the specifications check is re-invoked to examine the new situation. A change in the request and the specifications might require a change in the implementation details as well, and re-checking the new proposed implementation.

2.11. Approving the Firewall ACR (Stage 6100)

Approving the Firewall ACR can be done automatically by the system if no issues were found during the specification and implementation checks, or might require the approval of authorized users. In both cases, an approval record with a description of the checks that were performed and their status is conveniently produced.

Once a Firewall ACR is approved, it can be transferred to the relevant organizational function for deployment.

2.12. Rejecting the Firewall ACR (Stage 6110)

When severe issues are associated with the ACR, the decision might be to reject it. A rejection record with a description of the checks that were performed and their status is produced, enabling to find out the reasons for the rejection.

3. Deployment

The deployment of a change is typically performed by firewall operators. It is expected to be performed according to the implementation details specified in the ACR. If the ACR was approved without specifying implementation details, the implementation should be done to fulfill the specifications. Once an ACR is deployed the firewall operator is expected to mark the ACR as deployed. The operator might also be required to record the ACR ID as a comment for new or the changed rules and object groups.

3.1. The Post-Deployment Verification of Firewall Changes (Method 700)

Method 700 for post-deployment verification of firewall changes is disclosed. It is assumed that either specifications or implementation details were associated with the ACR. The post-deployment verification consists of:

a. Verification of deployed ACRs—checking that each deployed ACR was approved and deployed according to: (1) the specifications, and (2) the implementation details (the system can be configured to perform only one of the checks or both of them).

b. Verification that only approved changes have been introduced into the configuration.

Figure 4:
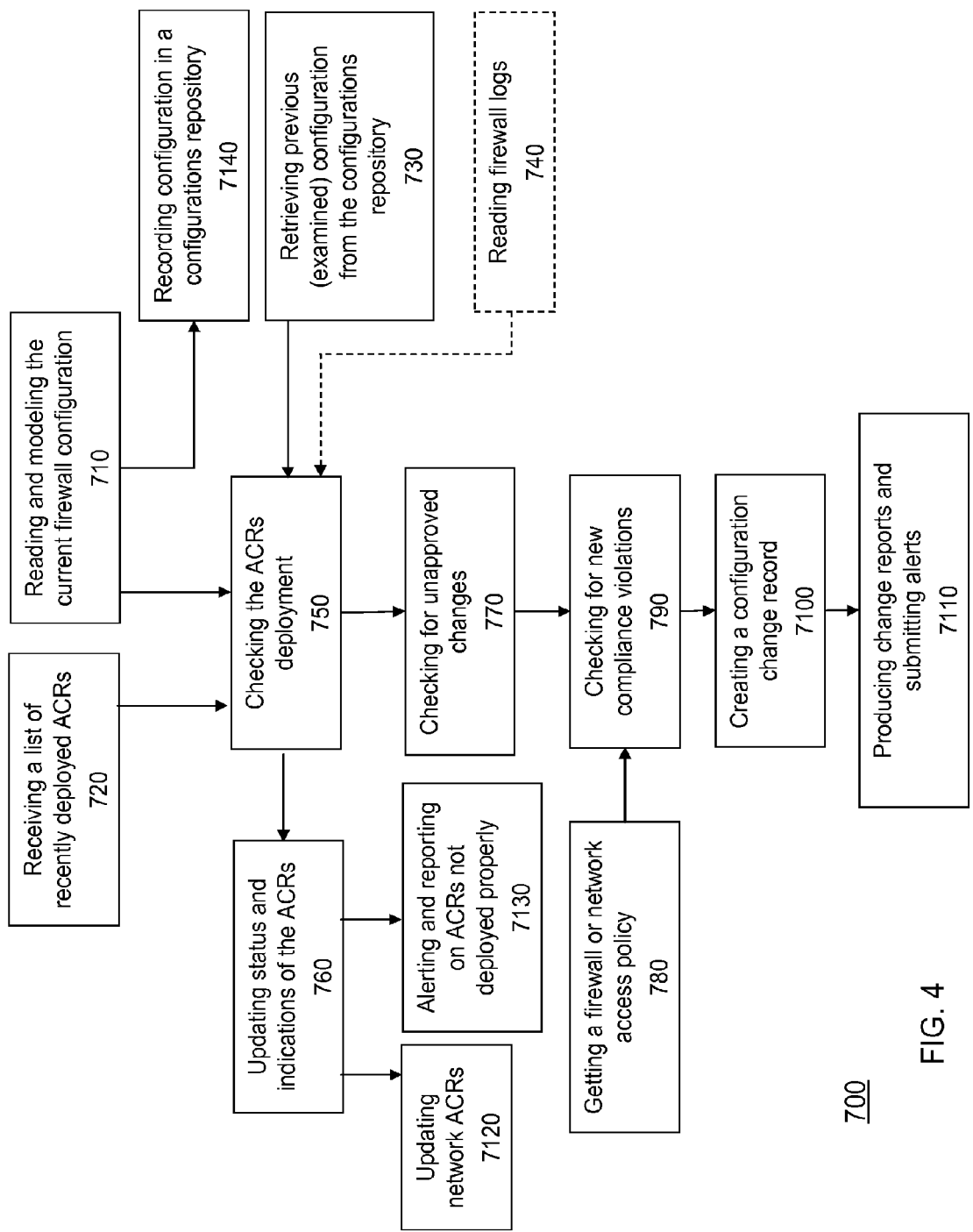
FIG. 4 illustrates a method for post-deployment verification of firewall changes, according to an embodiment of the invention.

FIG. 4 illustrates method 700 for post-deployment verification of firewall changes, according to an embodiment of the invention. It is noted that different embodiments of method 700 may include some or all of the stages herein described. It is noted that the order of stages and the workflow of method 700, according to different embodiments of which, is substantially illustrated in FIG. 4, while it is noted that not all of the stages, as well as additional stages not explicitly stated, may also be carried out in different implementations of method 700.

3.2. Reading and Modeling the Current Firewall Configuration (Stage 710)

According to an embodiment of the invention, method 700 includes modeling the current configuration of the firewall such as to include multiple formatted request items of a firewall ACR.

The post-deployment process assumes that firewall configurations are uploaded into the ACA environment regularly (e.g., every night at a certain hour), or whenever a deployment session of changes is completed. This is done using collection tasks which access the firewalls or their management system, retrieve the configurations and update the model. The firewall model represents the firewall network interfaces, routing information, the access rule set of the firewall, NAT (network address translation) rules, firewall group objects, and other firewall entities. The rules and the entities are represented in a canonic way.

Each time a new version of the firewall model is created the model is conveniently recorded in a configurations repository (stage 7140). The recorded configurations can be used as a reference for identifying and examining future changes in the configuration of firewalls.

3.3. Receiving the List of Recently Deployed ACRs (Stage 720)

As discussed in relations to the other methods, it is assumed that as part of the deployment process, the relevant ACR records are marked as deployed. Therefore, in stage 720 the list of deployed ACRs is retrieved. Those deployed ACRs that their deployment has not been verified yet, are considered as new deployed ACRs. The new deployed ACRs are checked stage 750.

Conveniently, stage 720 includes receiving information representative of approved ACRs.

3.4. Checking the ACRs Deployment (Stage 750)

Stage 750 includes checking a deployment of the ACRs, wherein each recently deployed Firewall ACR is conveniently checked to verify that:

a. It was approved for deployment (based on the ACR status)
b. The specifications of the ACR are supported by the current firewall configuration
c. The current firewall configuration is consistent with the implementation details specified in the ACR Conveniently, stage 750 includes checking a current configuration of a firewall to determine whether a connectivity that was a subject of an approved received ACR is deployed.

It is noted that stage 750 is conveniently preceded by at least one of stage 730 and 740, wherein stage 730 includes retrieving previous (examined) configuration (usually from the configurations repository), and stage 740 includes reading firewall logs.

3.4.1. Checking the APR Specification

This check examines if the current configuration of the firewall achieves the access (connectivity) change defined in the ACR specifications. The check is performed if the ACR has specifications (it might include only implementation details). The check is done by translating each specification item into an access query at the firewall level. In the case of Full Access specification item the query is, according to an embodiment of the invention, substantially "Will packets sent from the specified source addresses behind the inbound interface to the specified destination nodes behind the outbound interface pass the firewall?"

Answering the access query is done by taking in account the current firewall access rules and the routing rules of the firewall. The analysis might represent compactly group of packets using ranges of sources, destinations and services, rather than analyzing each packet separately. Appendix A includes a description and pseudo code of an algorithm for answering access queries.

The access change in the specification is achieved if each of the specification items is achieved. The status of the check is conveniently recorded in the Firewall ACR.

3.4.2. Checking the APR Implementation

The check of the implementation details verifies that all the required changes to rules and groups appear in the model of the current configuration. This can be done by examining each of the implementation items in the Firewall ACR, and examining if it matches in the model of the current configuration.

An entity creation instruction matches the current model if the entity exists and has the specified content. The instruction might not specify in certain cases an exact ID or name for the new entity (this is the case when a new rule is created). In these cases the search for the entity might be based on entity content (e.g., content of source, destination, and services, location instruction, comment).

Add item instruction (e.g., adding a group object to the destination of an existing rule) matches the current model if the item is appears within the attribute of the specified entity.

Remove item instructions, requires that the item will not be found within the attribute of the specified entity.

In some cases, an implementation instruction might modify the action of a previous implementation instruction in the list. For example an instruction for creating a rule with a set of addresses for the destination item and then in a later instruction adding an additional address to the destination of the rule. This can be resolved by pre-processing of the instructions list and augmenting the list to avoid this situation. For example, by modifying the instruction for creating the rule to include in the first place the added destination address.

Implementation instruction that are not matched, are marked as so in the Firewall ACR.

3.5. Updating the ACR Status and Indications of the ACRs (Stage 760)

ACRs which have been deployed and their verification tests failed are associated with a deployment problem indication. This indication can be used for sending alerts to relevant users, or for highlighting the problematic ACRs in views and reports (stage 7130)

A user that got an alert or an indication for a deployment problem, can examine the details of the problem, and decide whether to approve the deployment as is (in case of a minor or technical issue) or to request a correction of the problem.

An ACR that its verification tests succeeded, get an indication for the success of the verification tests. This indication can trigger a status change of the ACR ("Deployment verified", or even "Closed") or leave that final decision to the user.

A firewall related ACR that is closed, can trigger the closing of its network related parent ACR, provided all the other children ACRs of the parent have been closed as well (stage 7120).

3.6. Checking for Unapproved Changes (Stage 770)

Stage 770 is conveniently carried out to verify that only approved changes have been introduced into the configuration. Stage 770 includes determining whether the current configuration of a firewall is responsive to unapproved ACRs.

One technique which can be used for that is based on comparing the current firewall configuration with a previously checked configuration—i.e. comparing the current configuration of the firewall to a previous configuration of the firewall to provide a configuration difference—and verifying that all the differences are covered by required approved changes. The previous (reference) firewall configuration is retrieved from the configurations repository (stage 730).

The comparing is followed by determining whether the entire configuration difference results from approves access change request deployed between a point in time in which the current configuration of the firewall was deployed and another point in time in which the previous configuration of the firewall was deployed.

The comparison between the current configuration and the previous configuration can be done at three levels:

a. at the implementation level—by comparing rules and groups of the two configurations;
b. at the level of the effective scopes of access chains in the two models;
c. at the access level—comparing between the access capabilities of the two configurations.

The identified differences are compared with the implementation details of the deployed ACR or with its specifications (according to the level in which the comparison was performed). Those differences that are not covered by deployed (and approved) ACRs are recorded and reported. For example, assume that the current firewall configuration was found to allow access to from IP address 143.15.63.7 to port TCP/80 of IP addresses 172.17.34.21-172.17.34.23, an access that was not exist in the previous configuration. While this is definitely a difference between the configurations, ACR-4712, that was deployed after the previous configuration was uploaded into the model, requires connectivity from IP address 143.15.63.7 to port TCP/80 of IP addresses 172.17.34.21, and 172.17.34.22. The new identified connectivity to IP address 172.17.34.23, which is not covered by ACR-4712 (or any other deployed ACR) is marked as unapproved.

An alternative technique is based on the approach presented for checking the implementation of the pre-deployed ACR (stage 690 of method 600). The specification instructions of the deployed ACRs are added as firewall access rules to the top of the firewall access chains of the reference model. Then the access through the two models (the current model and the previous model with the specifications) is compared. The comparison can be done on the access results of access queries from the different interfaces of the firewall or by comparing differences in the effective scopes of corresponding chains in the two models.

This approach is also applicable for working at the level of the implementation instructions. The implementation instructions of the deployed ACRs are applied to the previous model. The resulting model is then compared with the current model.

Another alternative or complementary technique for finding unapproved changes is to verify that each change in the firewall change log appears in the approved implementation details of the deployed ACRs. This technique requires reading and analyzing firewall logs. Reading an analyzing firewall logs is an optional stage (stage 740).

3.7. Getting a Firewall or Network Access Policy (Stage 780)

A firewall access policy specifies constraints on the permitted access through firewalls (sec stage 630 of method 600). A network access policy specifics constraints on the permitted access in the network (sec stage 520 of method 500). Each one of them can be used for checking the compliance of firewalls and changes performed to firewalls. It is the user preference which policy to develop and use. In this stage, the policy to be used (firewall access policy or network access policy) is retrieved.

3.8. Checking for New Compliance Violations (Stage 790)

Stage 790 includes determining whether the current configuration of the firewall complies with a firewall access policy. The current firewall configuration is compared with the firewall access policy to verify compliance. When violations are identified, they are compared with violations occurred in the previous (reference) configuration, to identify those violations which are new.

3.9. Creating Configuration Change Records (Stage 7100)

For each new configuration version of a firewall, ACA creates a configuration change record. The record might include, by way of an example:

a. Details on the firewall and the configuration (ID, date);
b. References to the current configuration and previous (reference) configuration;
c. Information on new deployed and approved changes (ACRs) that the configuration includes;
d. The verification status of the approved changes;
e. Details on unapproved changes performed in the rule set (changes that have not been specified by an approved ACR);
f. Indication for new policy violations (optional)—violations that were created as a result of the changes in the configuration. Upon request, the new violations could be presented ordered or filtered by their severity.

3.10. Producing Change Reports and Submitting Alerts (Stage 7110)

The ACA environment can produce a daily report that presents the configuration changes performed for firewalls in the organization, their content, and verification results.

Alerts can be issued upon identification of unapproved changes in a firewall. For unapproved changes details can be presented, for example, using a diff view between a previous and the current configuration that highlights the unapproved changes.

Additional reports might be produced for presenting history of changes. The report can be can be used for periodic audit of changes, showing which changes have been performed, and what approval and validation they have been passed.

Periodic reports can be produced with statistics and metrics on the process. For example, such a report can show the rate of configuration changes that included unapproved changes or the number of the ACRs that were deployed not according to the implementation details.

4. Appendix A -Access Analysis Algorithm

The pseudo code offered herein presents a basic access analysis algorithm that examines which IP packers can be reach from specified source to specified destination. The source and the destination can represent a set of network nodes or IP addresses. The specification could also include specification of destination services (protocol and port). Extension of the algorithm can relate to other constraints such as source ports, network interfaces, authentication requirements, and more. For the simplicity of the explanation these extensions are not included in the pseudo code.

The answer to the query can optionally include the firewalls and the firewall access rules through which the packets were passed.

Access Analysis Algorithm
Input: Network model, Source, Destination
Output: The set of packets that could successfully be transferred from Source to Destination, optionally with information on rules that were used.
Terminology:
  Denote by source(n) the subset of node n addresses that are included in Source (the query source addresses).
  Denote by destination(n) the subset of node n addresses that are included in Destination (the query destination addresses).
1. Initialization:
1.1. For each node s which its source(s) is not empty (a "source node"):
  Set CAN_REACH(s) to represent all possible packets that their source is in source(s), their destination is any address, and their destination service is any combination of protocol and port.
  Insert s into TO_BE_HANDLED
1.2. For all the other nodes:
  Set CAN_REACH of the node to represent an empty set of packets.
2. While the TO_BE_HANDLED list is not empty:
2.1. Pick a node n from the TO_BE_HANDLED list and remove it from the list
2.2. For each neighbor n' of n:
  Update CAN_REACH(n') to represent (in addition to previous representation) all packets of CAN_REACH(n) that pass through n and can arrive at n'.
  Consider in that computation access filtering rules and NAT rules of n, and routing rules from n to n'

Update CAN_REACH(n'), if required, with information on rules that their scope matches packets that pass through n and can arrive at n'

If CAN_REACH(n') was modified, insert n' into TO_BE_HANDLED.

3. For each node n with a non-empty destination(n):

3.1. Apply local access rules of n (if exist) to CAN_REACH (n)

3.2. Add to the output those packets in CAN_REACH(n) that their destination is in destination(n).

The nodes considered by the algorithm can represent network devices (firewalls, routers, etc.), hosts, networks, and network areas which are not modeled ("clouds"). When a node represents a network or a cloud, it might include a set of IP addresses (specified as a range of IP addresses or as a set of ranges of IP addresses). The set of nodes can also be extended to represent layer 2 segments (in case of layer 2 filtering devices).

The neighbor nodes of a network device can be networks directly connected to its network interfaces (adjacent networks), network devices or hosts within the adjacent network, or clouds connected to the network interfaces of the network device.

The neighbor nodes of a network or a cloud are the network devices which are connected to them.

The set of source nodes (step 1.1) are nodes that their set of addresses includes addresses specified in the source of the query.

A CAN_REACH data item is associated with each of the nodes. It represents the set of packets that can reach the node from the source nodes (this is computed through the algorithm).

Initially, the TO_BE_HANDLED list includes the source nodes. The CAN_REACH data item of each source node s represents all the possible packets that their source is in an address of s which appears in the source of the query, their destination is any address, and their destination service is any combination of protocol and port.

Notes:

a. The destination addresses and services are not limited to those specified in the query in order to support the usage of NAT (Network Address Translation) and PAT (Port Address Translation) rules in firewalls and network devices. In this case, the destination addresses and ports of the packets at the source node might be different from the actual IP addresses of the destination nodes, and the actual ports number which they open. The assumption here is that the query destination relates to the IP addresses of nodes as appear in the network. In case the query specifies the packets destination, that destination can be used for the packets initialized in the CAN_REACH data item.

b. The CAN_REACH data item might represent the set of packets using ranges of sources, destinations, and services rather than representing each packet explicitly.

The algorithm computes and updates iteratively the CAN_REACH data item of nodes, starting at immediate neighbors of the source nodes, continuing with neighbors of neighbors and so on until there are no more nodes to be updated (TO_BE_HANDLED is empty).

At each iteration of the while loop (step 2), a node n to be handled is selected, and the CAN_REACH data item of its neighbors is computed. The computation of the CAN_REACH of a neighbor node n' includes the merging (union) of packets already represented in CAN_REACH of n' with packets that can arrive to n' from n. The packets that can arrive from n are computed by: (i) Applying to CAN_REACH of n the access filtering rules and the NAT rules of n, and the routing rules from n to n', and (ii) optionally, updating the representation of these packets with information on rules that their scope (source, destination and interface) matched packets transferred from n to n'.

Neighbors which their CAN_REACH data item was updated are added to TO_BE_HANDLED to enable the update of their neighbors in one of the next iterations.

At the end of the algorithm the CAN_REACH of the destination nodes are updated to take in account local rules of destination nodes (for example access rules of local firewalls) . Then the CAN_REACH data items of the destination nodes are processed to report the packets from the source (of the query) to the destination (of the query) which can reach at the destination.

The algorithm can be applied also for the case of analyzing access through a single firewall. In that case the "network" is quite simplistic. It includes the firewall, connected through its network interfaces to nodes, each of which represents the set of addresses that can reside behind the corresponding network interface. These addresses can be deducted for examples from the routing rules of the firewall.

Variation of the algorithm can be used for checking which rules block an access. This can be done by maintaining for each node additional data item CANNOT_REACH which holds packets that were supposed to be routed to the node but were blocked by an firewall access rule. The blocking rule can be recorded with the packet. At the end of the algorithms the blocking rules are extracted from the CANNOT_REACH data item of the destination nodes.

The present invention can be practiced by employing conventional tools, methodology and components. Accordingly, the details of such tools, component and methodology are not set forth herein in detail. In the previous descriptions, numerous specific details are set forth, in order to provide a thorough understanding of the present invention. However, it should be recognized that the present invention might be practiced without resorting to the details specifically set forth.

Only exemplary embodiments of the present invention and but a few examples of its versatility are shown and described in the present disclosure. It is to be understood that the present invention is capable of use in various other combinations and environments and is capable of changes or modifications within the scope of the inventive concept as expressed herein.

The invention claimed is:

1. A method for evaluating a deployment of a network access change request, the method comprises the following computer implemented steps:

formatting a network access change request to provide a formatted network access change request; wherein the formatted network access change request comprises multiple formatted request items; wherein the multiple formatted request items comprise a requested access type, an address of an access source, an address of an access destination;

determining multiple relationships between the multiple formatted request items and corresponding items of at least one entity out of a network model and a current network policy;

responding to the network access change request in response to the multiple determined relationships;

receiving an amended network access change request if a requested connectivity that is a subject of the network access change request is not in compliance with the current network policy;

determining multiple relationships between multiple items of the amended network access change request and corresponding items of at least one entity out of a network model and a current network policy; and responding to the amended network access change request in response to the multiple determined relationships.

2. The method according to claim 1 comprising determining whether a requested connectivity that is a subject of the network access change request is currently implemented in the network; and determining whether the requested connectivity is in compliance with the current network policy.

3. The method according to claim 1 comprising evaluating a risk associated with a deployment of the network access change request.

4. The method according to claim 1 comprising converting a formatted network access change request to at least one firewall access change request.

5. The method according to claim 1 comprising evaluating compliance of the change request with the current network policy.

6. A method for evaluating a deployment of a network access change request, the method comprises the following computer implemented steps: formatting a network access change request to provide a formatted network access change request; wherein the formatted network access change request comprises multiple formatted request items; wherein the multiple formatted request items comprise a requested access type, an address of an access source, an address of an access destination; determining multiple relationships between the multiple formatted request items and corresponding items of at least one entity out of a network model and a current network policy;

converting a formatted network access change request to at least one firewall access change request;

formatting a firewall access change request to provide a formatted firewall access change request; wherein the formatted firewall access change request comprises multiple formatted request items; wherein the multiple formatted request items comprise a firewall identifier, requested access type, an address of an access source, an address of an access destination;

determining multiple relationships between the multiple formatted request items and corresponding items of at least one entity out of a firewall model and a current firewall policy; and responding to the firewall access change request in response to the multiple determined relationships.

7. The method according to claim 6 comprising: receiving an amended network access change request if a requested connectivity that is a subject of the network access change request is not in compliance with the current network policy; determining multiple relationships between multiple items of the amended network access change request and corresponding items of at least one entity out of a network model and a current network policy; and responding to the amended network access change request in response to the multiple determined relationships.

8. A method for evaluating a deployment of a firewall access change request, the method comprises the following computer implemented steps:

formatting a firewall access change request to provide a formatted firewall access change request; wherein the formatted firewall access change request comprises multiple formatted request items; wherein the multiple formatted request items comprise a firewall identifier, requested access type, an address of an access source, a requested access destination;

defining implementation details that facilitate a connectivity that is a subject of the firewall access change request; checking the implementation details; and checking whether a packet sent from a requested access source can reach from a requested access source to a requested access destination and checking whether a requested access type can be supported by a firewall identified by the firewall identifier.

9. The method according to claim 8 comprising evaluating a risk associated with a deployment of the firewall access change request.

10. The method according to claim 8 comprising representing a firewall access change request by at least one rule selected from an allow rule and an a deny rule and evaluating the at least one rule.

11. The method according to claim 8 comprising checking for overlaps between a firewall rule generated in response to the firewall access change request and between currently defined firewall rules.

12. The method according to claim 8 comprising checking a consistency between the formatted firewall access change request and the implementation details.

13. The method according to claim 8 comprising checking whether implementation details that are associated with a certain formatted firewall access change request support precisely a connectivity that is a subject of the certain formatted firewall access change request.

14. The method according to claim 8 comprising checking a compliance of the implementation details with at least one entity out of a firewall access policy and a network access policy.

15. The method according to claim 8 comprising checking a compliance of a connectivity change that is a subject of the firewall access change request with at least one policy out of a network access policy and a firewall access policy.

16. The method according to claim 8 comprising comparing between the requested access type, the address of an access source, and the requested access destination of the firewall access change request and a supported access type, address of an access source, and an access destination of a policy access rule of the firewall access policy.

17. A method for evaluating a deployment of a firewall access change request, the method comprises the following computer implemented steps:

formatting a firewall access change request to provide a formatted firewall access change request; wherein the formatted firewall access change request comprises multiple formatted request items; wherein the multiple formatted request items comprise a firewall identifier, requested access type, an address of an access source, a requested access destination;

defining implementation details that facilitate a connectivity that is a subject of the firewall access change request; checking the implementation details;

checking whether a packet sent from a source address of a network access policy rule can reach from the source address of the network access policy rule to a destination address of the network access policy rule;

and checking whether the packet was allowed or denied by a firewall identified by the firewall identifier, and by considering the access type of the network access policy rule.

18. The method according to claim 17 comprising checking whether a packet sent from a requested access source can reach from a requested access source to a requested access destination and checking whether a requested access type can be supported by a firewall identified by the firewall identifier.

* * * * *